United States Patent [19]

Lerner

[11] 3,863,198
[45] Jan. 28, 1975

[54] DOPPLER SONAR UTILIZING PERIOD MEASUREMENT WITH THRESHOLDED RECEIVERS

[75] Inventor: Seymour D. Lerner, Plainview, N.Y.
[73] Assignee: Sperry Rand Corporation, New York, N.Y.
[22] Filed: Oct. 25, 1973
[21] Appl. No.: 409,522

[52] U.S. Cl. .................................. 340/3 D, 343/9
[51] Int. Cl. ........................ G01s 7/66, G01s 9/66
[58] Field of Search .................. 340/3 D; 343/8, 9

[56] References Cited
UNITED STATES PATENTS
3,795,893  3/1974  Kritz et al. ........................ 340/3 D Primary Examiner—Richard A. Farley
Attorney, Agent, or Firm—Howard P. Terry; Joseph M. Roehl

[57] ABSTRACT

Speed measurement error due to additive noise in the receivers of period-measuring doppler sonar apparatus is reduced by performing the period measurement process when and only when the signal is sufficiently strong. When the envelope of the received signal-plus-noise exceeds a preset threshold, a comparator output enables the initiation or the continuation of a doppler gate until N received periods have been counted. Typical logic, gating, counting and display circuitry is described which transforms this gate duration into an accurate indication of speed. Higher threshold levels can be established for increased accuracy at the expense of increased measurement time.

11 Claims, 2 Drawing Figures

DOPPLER SONAR UTILIZING PERIOD MEASUREMENT WITH THRESHOLDED RECEIVERS

BACKGROUND OF THE INVENTION

1. Field of the Invention

This invention relates to marine guidance and navigation systems and more specifically to systems employing sonar doppler techniques.

2. Description of the Prior Art

A wide variety of marine navigators and guidance devices employing sonar doppler techniques is known in the art. One class of devices, generically labelled "Janus" type devices, utilizes pairs of azimuthly opposed sonic beams such as a forward-looking and an aft-looking beam in order to cancel errors caused by roll, pitch and heave of the vessel. Horizontal motion of the vessel causes doppler shifts in the frequency of the sound waves reflected from the ocean bottom and/or water mass. This results in a difference in frequencies of the reflected beams and permits a measurement of the speed of the vessel.

In systems designed for bottom reflection of the sonic energy, the speed measured is ground speed. In systems designed to respond to sonic energy reflected from the water mass itself, the speed measured is water speed. The latter systems include water speed logs as well as current meters.

Copending patent application number Ser. No. 159,853 now U.S. Pat. No. 3,795,893 filed in the names of Jacob A. Kritz and Seymour D. Lerner and assigned to the present assignee, relates to a doppler speed log in which the "frequency" of the received signal in a doppler sonar channel is determined by measuring the average period of the received signal. This is accomplished by generating a gate pulse equal in width to a fixed number of periods of the received signal. The frequency difference between the signals received in the two receiver channels, which is proportional to speed, is then found by gating a fixed frequency clock with the gate signals and accumulating the difference in an up-down counter.

Although the techniques used in the aforementioned copending patent application represent a significant improvement over prior art devices, errors caused by noise at the receiver output in addition to signal still exist. The present invention provides a means of substantially reducing the magnitude of this noise error.

SUMMARY OF THE INVENTION

The envelope of signal-plus-noise fluctuations appearing at the output of each receiver in a doppler sonar is detected. Only when this envelope exceeds a preset threshold is the doppler gate for that channel permitted to open so that the period count can proceed. The gate remains open until the count reaches a predetermined number unless the signal-plus-noise envelope drops below the threshold. If this happens, the doppler gate closes while the period count reached to that point is retained in the counter. When signal-plus-noise envelope again exceeds the threshold, the doppler gate reopens and the count resumes. Thus, assuming a noisy signal, a number of doppler gates are produced having a total time duration corresponding to the predetermined number of periods. The thresholding process greatly enhances the statistical probability that the periods thus averaged represent signal rather than noise.

DESCRIPTION OF THE PREFERRED EMBODIMENT

Figure 1:
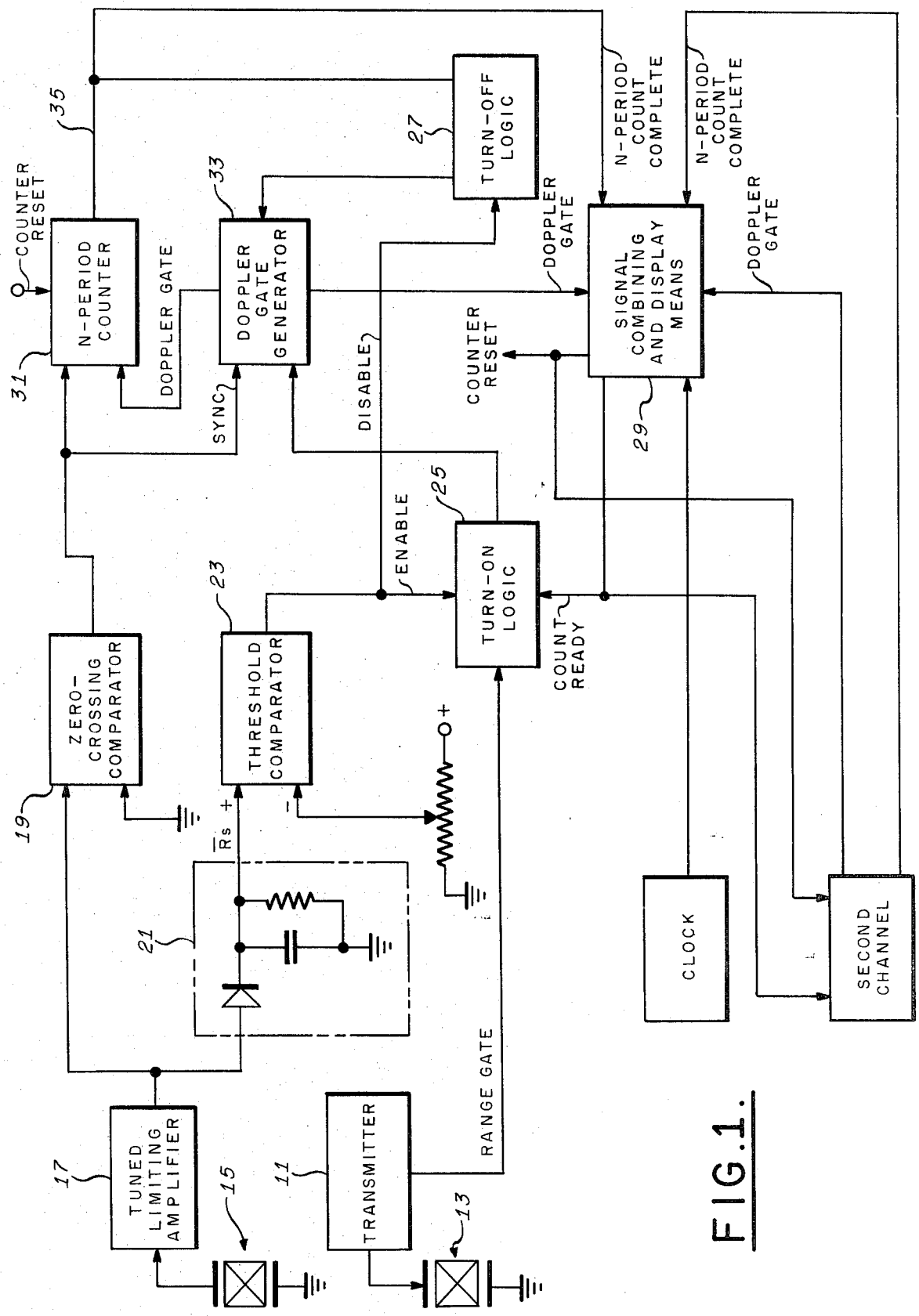
FIG. 1 is a block diagram illustrating an arrangement of components useful in practicing the invention.

The principles of the invention can best be understood by first considering the underlying theory.

Zero Crossings of Sum of Two Sine Waves

One of the crucial concepts upon which the thresholding technique is based concerns the zero-crossings of the sum of two sine waves. It is readily shown that if two sine waves having radian frequencies of $\omega$ and ($\omega + \Omega$); amplitudes of unity and $\alpha$ respectively, and displaced from each other by $\phi$ degrees, are combined, the resultant displacement at time $t$ is given by:

$$e = \sin \omega t + \alpha \sin [(\omega + \Omega)t + \phi] \qquad (1)$$

The rate of positive-going zero crossings of $e$ is $\omega/2\pi$, just as if $\alpha$ (or $\Omega$) were zero, provided that $$\alpha < 1/[1 + \Omega/\omega)] \qquad (2)$$

Since in all practical Doppler systems the Doppler shift is small compared to the transmitted frequency, Doppler receivers are narrowband. Therefore, $$\Omega << \omega \qquad (3)$$

for all signal and noise voltages passed by the receiver, and (2) reduces to $$\alpha < 1 \qquad (4)$$

That is, the zero-crossing rate of the sum of two sine waves in a narrowband amplifier is the rate of the larger of the two component waves undisturbed by the presence of the smaller wave.

Quasi-Sinusoidal Nature of Doppler Signals and Noise

It is well known that doppler signal, $e_s$, as the sum of randomly-phased backscatter components from particles in the water mass or bottom, has many of the attributes of random noise and is representable in the form $$e_s = R_s(t) \sin [\omega_s t + \beta_s(t)] \qquad (5)$$

Here $R_s(t)$ and $\beta_s(t)$, the envelope and phase functions, respectively, of $e_s$ vary at a rate commensurate with the spectral width of the doppler return—a width determined by such factors as vessel speed, transducer beamwidth, and (for a pulse system) transmitted pulse width. In any event, the fluctuation rates of $R_s$ and $\beta_s$ are low compared with $\omega_s$, so that $e_s$ has the appearance of and behaves like a sine wave of frequency $\omega_s$ with slowly varying amplitude (and phase).

In like manner the random noise, $e_N$ present at the output of a doppler receiver—whether its source be sea noise, flow noise, receiver front-end noise, or a combination of all three—is representable as $$e_N = R_N(t) \sin [\omega_N t + \beta_N(t)] \qquad (6)$$

Here the subscripts $N$ designate the noise components corresponding to the signal components appearing in equation (5). $R_N(t)$ and $\beta_N(t)$ fluctuate more rapidly than do their signal counterparts, corresponding—as they do—to the full spectral width of the receiver. However, this fluctuation rate is still small compared to $\omega_N$—the average noise frequency—so that $e_N$ is also quasi-sinusoidal.

As envelopes of noise processes, both $R_s$ and $R_N$ can be characterized, in terms of their respective powers $P_s$ and $P_N$, by probability distributions. Specifically, since $R_s$ and $R_N$ are uncorrelated, the probability that at any constant $R_s$ is between $R_s$ and $R_s + dR_s$ and $R_N$ is between $R_N$ and $R_N + dR_N$ is $$p(R_s, R_N)dR_s dR_N = \frac{R_s}{P_s} \epsilon^{-\frac{R_s^2}{2P_s}} dR_s \frac{R_N}{P_N} \epsilon^{-\frac{R_N^2}{2P_N}} dR_N. \quad (7)$$

Noise Error

In accordance with the previous discussion relating to zero-crossings of two sine waves, whenever $R_s > R_N$, the channel reads $\omega_s$; when $R_N < R_s$, the channel reads $\omega_N$. Therefore, the $i^{th}$ channel of a doppler system measures an average frequency of $$f_i = p_{s_i} f_{s_i} + p_{N_i} f_{N_i} \quad (8)$$

Here $f_{s_i}$ and $f_{N_i}$ are signal and noise spectral-center frequencies, respectively, of the $i^{th}$ channel; $p_{s_i}$ and $p_{N_i}$ are the probabilities that, at any instant, the channel operates on signal or noise, respectively. However, since $p_{s_i} + p_{N_i} = 1$, (8) becomes $$f_i = (1 - p_{N_i})f_{s_i} + p_{N_i} f_{N_i} \quad (9)$$

In a typical forward, backward-looking Janus configuration, speed is proportional to the difference between the two channel output frequencies. That is, $f_M = f_2 - f_1$.

Noise error—a quantity indicative of the fractional error resulting from non-infinite signal-noise ratios in the receivers—is $$\xi = \frac{|f_M - f_{M_0}|}{f_{M_0}} = \left| \frac{f_M}{f_{M_0}} - 1 \right|,$$

where
$$f_{M_0} = f_{s_2} - f_{s_1}$$
is the zero-noise difference frequency. Equation (8) with $i = 1, 2$ yields $$\xi = \left| \frac{p_{N_2}(f_{N_2} - f_{s_2}) - p_{N_1}(f_{N_1} - f_{s_1})}{f_{s_2} - f_{s_1}} \right|. \quad (10)$$

In most systems $p_{N_1} = p_{N_2} = p_N$, so that (10) reduces to $$\xi = \left| \frac{f_{N_2} - f_{N_1}}{f_{s_2} - f_{s_1}} - 1 \right| p_N. \quad (11)$$

The noise error, from (11), is seen to be equal to $p_N$, the fraction of total time each channel operates on noise, modified by a factor which takes into account noise and signal centers of energy. It will be shown that by the introduction of a minimum-envelope threshold in each channel, the value of $p_N$, and therefore noise error, can be substantially reduced.

The manner in which these principles may be embodied in a specific circuit is shown in FIG. 1, which illustrates one channel of a dual channel system. Pulses from a transmitter 11 energize a transducer 13 which launches bursts of acoustic energy downwardly and outwardly from the hull of the vessel in accordance with known principles. Reflected acoustic energy is returned along the path of the transmitted pulses and impinges on a hydrophone 15. The transducer 15 converts the acoustic signal into a corresponding electrical signal which may be processed in the associated channel.

Although the transducers 13 and 15 are shown as separate devices, it will be appreciated that in many instances both the transmitting and receiving functions may be combined in a single transducer by using a conventional transmit-receive switch in accordance with well known principles.

The electrical signal from the transducer 15 is applied to a tuned limiting amplifier 17. The amplifier 17 is a tuned, fixed-gain amplifier which includes limiting, rather than automatic gain control means. The amplifier is tuned to accept all frequencies expected within the desired speed range, but to reject noise frequencies remote from this range. The limiting level is set above the threshold level to be described. The output of the amplifier 17 is applied to a zero crossing comparator 19 which provides a train of output pulses representing the zero crossings of a signal-plus-noise output of the limiting amplifier 17. The comparator 19 is of a straightforward design and utilizes a reference voltage at ground level.

The output of the limiting amplifier is also applied to an envelope detector 21. The envelope detector 21 typically contains a rectifier feeding an R-C network which tends to average the signal applied to its input. Typically, the envelope detection time constant is chosen so as to follow the relatively slow fluctuations of the signal but to average the rapid noise fluctuations.

The signal from the envelope detector 21 is applied to a conventional threshold comparator 23 which is biased in accordance with well known principles so as to produce a specified output signal only when the signal from the detector 21 exceeds a preset threshold value.

The output from the threshold comparator 23 is applied to a turn-on logic 25 and to a turn-off logic 27. The logic means 25 and 27 may be conventional AND gates.

The output from the threshold comparator 23 may conveniently be considered to be a logic ONE which serves as an enable signal that actuates the turn-on logic when the signal from the envelope detector 21 exceeds the preset threshold valve and as a logic ZERO signal which serves as a disable signal to actuate the turn-off logic 27 when the signal from thee envelope detector 21 is less than the preset threshold value.

The turn-on logic is also responsive to range gate signals from the transmitter 11. In accordance with well known principles, transmitters for pulsed systems typically include means for producing a range gate signal at a preselected time after a signal has been applied to the transducer means.

The turn-on logic further responds to a COUNT READY signal from the signal combining and display means 29 which will be explained in detail.

The output pulses from the zero-crossing comparator 19 are applied to an N-period counter 31 and to a doppler gate generator 33 where they are used as synchronizing signals.

The doppler gate generator is a conventional switching circuit such as a J-K flip flop which is switched to a first or a second state by a sync pulse occurring in the presence of a voltage from the turn-on or turn-off logic respectively. The generator 33 provides a doppler gate commencing with the first occurrence of a sync pulse in the presence of a turn-on logic voltage and terminating with the first subsequent sync pulse occurring in the presence of a turn-off logic voltage.

The N-period counter 31 is a conventional overflow counter which is enabled by the doppler gate and produces an output signal on the line 35 after a predetermined number of pulses have been counted.

The occurrence of the range gate in conjunction with a threshold enable signal (logic ONE) from the threshold comparator and a COUNT READY signal from the signal combining and display means, permits the doppler gate generator to switch when synced by the next positive crossing from the zero-crossing comparator 19. When the doppler gate generator switches, it produces a doppler gate signal which permits the signal-plus-noise zero-crossing to enter the N-period counter.

Under strong-signal conditions, the threshold comparator output is always logic ONE and the periods required for the speed display are registered in minimum possible time. When the N-period counter overflows, a signal is applied to the turn-off logic which acts to switch off the doppler gate generator 33 at the occurrence of the next signal-plus-noise zero-crossing, so as to terminate the doppler gate signal.

When the received signal is weaker, the threshold comparator output occasionally drops to logic ZERO which produces a threshold disable signal at one input of the turn-off logic. This causes the turn-off logic to actuate the doppler gate genrator at the next sync signal so as to terminate the doppler gate for the time being. In the absence of a doppler gate, the N-period counter cannot respond to additional zero-crossings so that the counter holds the count already accumulated. When the signal again increases, the threshold comparator again produces a logic ONE output signal so that the turn-on logic is again enabled. The doppler gate generator switches at the occurrence of the next sync signal so as to restore the doppler gate. In this manner, the doppler gate is opened and closed automatically as often as necessary to accumulate N periods of signal-plus-noise when the envelope threshold is exceeded.

The doppler gate generator provides doppler gate signals to the signal combining and display means 29 as well as to the N-period counter. Furthermore, the overflow signal from the N-period counter 31 is also applied to the signal combining and display means as a COUNT COMPLETE signal for reasons which will become apparent as the description proceeds.

Thus it can be seen that the time integral of the doppler gate signal applied to the signal combining and display means during a given measurement interval is a measure of the net time required for the N-period counter to react to N pulses regardless of the number of interruptions occurring during that measurement interval.

The signal combining and display means 29 also receives second doppler gate and N-period COUNT COMPLETE signals from a second channel.

In most instances, the invention will be used in a Janus system wherein the hydrophone 15 may, for instance, be oriented in a forward-looking direction and a corresponding hydrophone for use with the second channel may be oriented in an aft-looking direction. In such an arrangement, the second channel will be identical to the previously described signal processing channel. The range gate from the transmitter 11 and the COUNT READY signal from the signal combining and display means 29 will be applied to the turn-on logic in the second channel as well as the turn-on logic in the already-described signal processing channel. Similarly, the COUNTER RESET signal from the signal combining and display means will be applied to the N-period counters in each of the channels.

Ordinarily, the doppler gates will overlap by an amount depending upon the doppler shifts experienced by the received signal and depending upon whether or not the threshold comparator in either or both of the channels have interrupted the operation of the N-period counters. For the same reason, the commencement of the two COUNT COMPLETE signals will ordinarily be offset.

Figure 2:
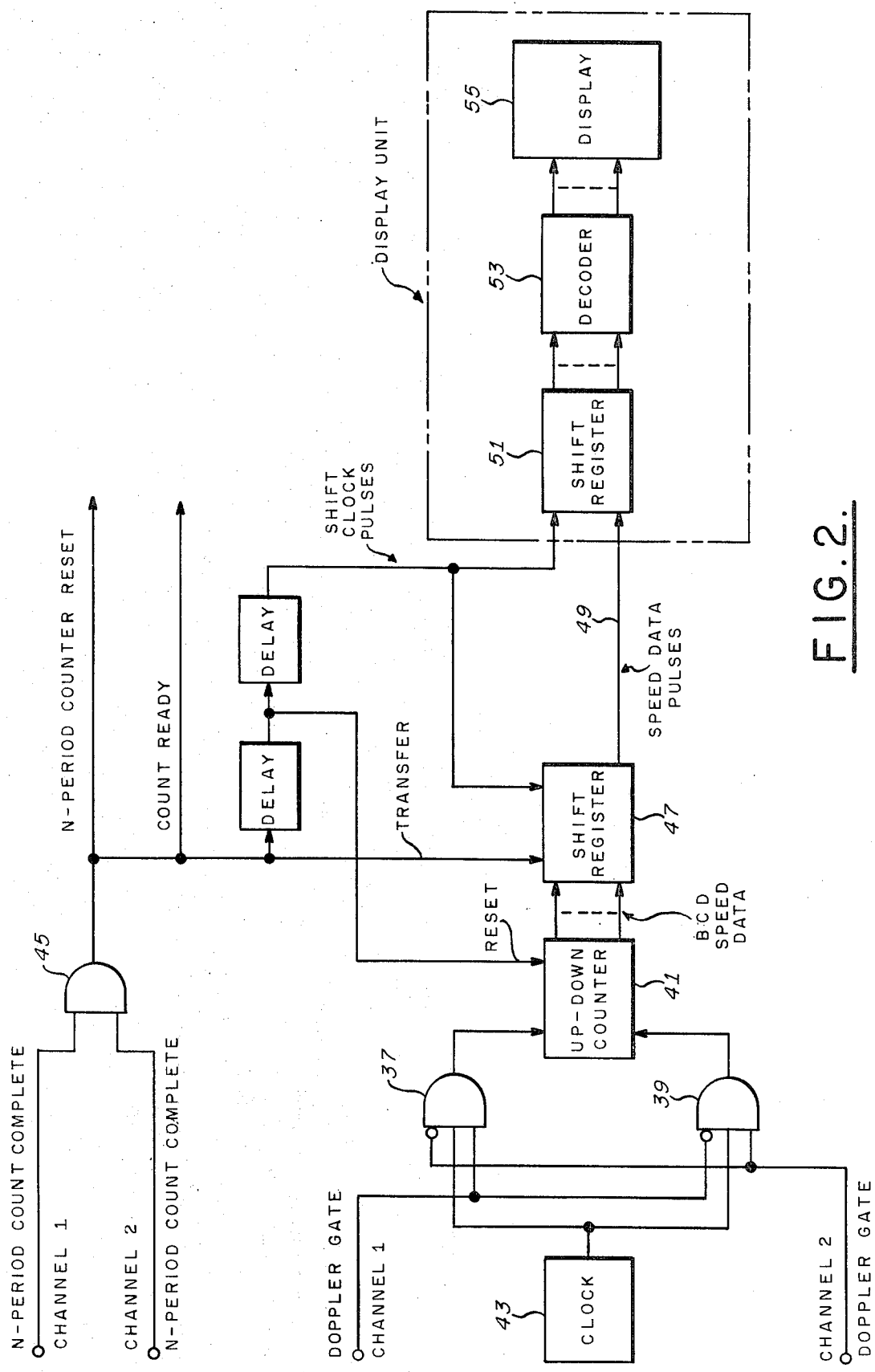
FIG. 2 is a diagram illustrating one arrangement of components used in the signal combining and display means of FIG. 1.

A suitable signal combining and display means is depicted in FIG. 2. In accordance with known principles, the circuit of FIG. 2 measures the difference in time duration of the two doppler gates from the respective channels by selectively applying clock pulses of a known frequency to an up-down counter during the occurrence of one but not both of the dopper gates, and then determining the value of the stored count at the end of a measurement interval.

More specifically, the doppler gate from the channel 1 is applied directly to a first AND gate 37 and also inverted and applied to a second AND gate 39. In a similar manner, a doppler gate from channel 2 is applied directly to the AND gate 39 and in an inverted fashion to the AND gate 37. Output signals from the gates 37 and 39 are applied to an up-down counter 41. A clock source 43 applies pulses of a known frequency to both AND gates. Gate 37 will be opened only when a doppler gate appears in channel 1 but not in channel 2; gate 39 will be opened only when a doppler gate appears in channel 2 but not in channel 1. The up-down counter will then respond in a sense depending upon which of the two channels is providing the doppler gate.

The up-down counter will remain available for the acquisition of counts until the N-period counters in both channels overflow and provide COUNT COMPLETE signals to a "count ready" logic AND gate 45 which initiates readout of the information and prepares the circuit for a new measurement interval.

More specifically, the presencee of COUNT COMPLETE signals from both channels results in an output signal from the gate 45. This transfers information from the up-down counter to a shift register 47 from which it can be applied to a suitable display means.

The output signal from the gate 45 is also used to reset the N-period counters in the two channels and to provide a COUNT READY signal which prepares the turn-on logic circuits in the two channels for the next measurement interval.

The signal from the gate 45 is also delayed for a suitable length of time and then applied as a reset pulse to the up-down counter 41, which prepares this counter for the acquisition of fresh data in the next measurement interval.

Typically, the display unit will be at a position remote from the signal reception, processing and combining portions of the circuit. Thus information temporarily stored in the shift register 47 must be transmitted by means of a transmission line 49 to the remote display unit. In a typical circuit, the output of the gate 45 may be delayed a second time and used to trigger information out of the shift register 47 and into a shift register 51 in the display unit. The output of the shift register may then be applied to suitable conventional decoder 53 which transforms the information into a form suitable for actuating a conventional display unit 55 so that the readout is calibrated in suitable units of speed measurement. Means for accomplishing such a transformation are disclosed, for example, in the previously-mentioned U.S. Pat. No. 3,795,893.

As presently preferred, the thresholding concept of the present invention is ordinarily utilized in a pulsed Janus system in which the transmitter emits bursts of oscillatory energy and in which the receiving circuits are actuated during the interval between transmitter pulses. In such systems, the transmitter provides a conventional range gate which effectively permits the receiving equipment to "look at" the return pulse at a specified time after the transmitted pulse has been launched. It will be appreciated that the thresholding concept of the present invention may also be applied to CW systems wherein the threshold levels established must discriminate against transmitter feed-through as well as noise.

Furthermore, although the thresholding concept of the present invention is ordinarily applied to a Janus system, the same principle may be applied to a single beam system wherein the second channel (FIG. 1) takes the form of a reference channel in which a pulse source provides simulated doppler gate signals of fixed duration and frequency with which the doppler gate from the signal processing channel may be compared. The reference channel also provides simulated COUNT COMPLETE signals for establishing times when information is to be displayed and the circuit is to be prepared for a new measurement interval.

The establishment of a threshold for detected signal-plus-noise envelope represents a convenient and effective means for increasing the likelihood that $R_s < R_N$ when the period-measurement system operates, so that $\omega_s$ rather than $\omega_N$ is measured. It is reasonable to except that the composite signal-plus-noise envelope reaches an elevated threshold more frequently due to large $R_s$ values than large $R_N$'s, since $P_s$ is assumed greater than $P_N$ in (7). Confirmation of this expectation lies in the derivation which follows.

With the envelope detection time constant chosen so as to follow the relatively slow fluctuations of $R_s$ but to average the rapid $R_N$ fluctuations, the envelope $\bar{R}$ of signal-plus-noise is $$\bar{R} = \sqrt{\frac{P_N \pi}{2}} \epsilon^{-\frac{R_s^2}{4P_N}} \left[ \left(1 + \frac{R_s^2}{2P_N}\right) I_0\left(\frac{R_s^2}{4P_N}\right) + \frac{R_s^2}{2P_N} I_1\left(\frac{R_s^2}{4P_N}\right) \right]. \quad (12)$$

Here the functions $I_0$ and $I_1$ are modified Bessel functions of the first kind.

The foregoing expression derives from equations 3.10–12 and 4B-9 included in an article entitled "Mathematical Analysis of Random Noise" appearing in Volumes 23 and 24 of the Bell Systems Technical Journal.

The fraction of time, $p_T$, that detector output $R$ exceeds $R_T$ is:

$$p_T = \frac{1}{\Gamma P_N} \int_{R_s^*}^{\infty} R_s \epsilon^{-\frac{R_s^2}{2\Gamma P_N}} dR_s, \quad (13)$$

or:

$$p_T = \epsilon^{-\frac{R_s^{*2}}{2\Gamma P_N}},$$

where $\Gamma$ is the signal-to-noise ratio, viz., $$\Gamma = P_s/P_N \quad (14)$$

The signal envelope $R_s^*$ in (13) is the value which causes the threshold comparator to switch and is found by setting $\bar{R} = R_T$ in (12) and solving for $R_s = R_s^*$. It is evident that, as the threshold $R_T$ is increased, $p_T$ decreases, thereby increasing the operating time required to obtain the fixed N-period count.

The probability that detector output $\bar{R}$ exceeds threshold $R_T$, and $R_N$ exceeds $R_s$ is found by integrating (7) over suitable limits.

$$p_A = \frac{1}{\Gamma P_N} \int_{R_s^*}^{\infty} R_s \epsilon^{-\frac{R_s^2}{2\Gamma P_N}} dR_s \cdot \frac{1}{P_N} \int_{R_s}^{\infty} R_N \epsilon^{-\frac{R_N^2}{2P_N}} dR_N$$

$$= \frac{1}{\Gamma P_N} \int_{R_s^*}^{\infty} R_s \epsilon^{-\frac{(1+\Gamma)R_s^2}{2\Gamma P_N}} dR_s,$$

or:

$$p_A = \frac{1}{1+\Gamma} \epsilon^{-\frac{R_s^{*2}(1+\Gamma)}{2\Gamma P_N}}. \quad (15)$$

Therefore, the probability $p_N$ that when the threshold is exceeded $R_N > R_s$ is $p_N = p_A/p_T$ and, from (13) and (15)

$$p_N = \frac{1}{1+\Gamma} \epsilon^{-\frac{R_s^{*2}}{2P_N}}. \quad (16)$$

This probability, when inserted in (11), yields noise error.

While the introduction of a minimum-amplitude requirement at the receiver output reduces noise error, it also increases the time required to accumulate a fixed number of periods, i.e., to update the speed reading. With optimum logic design the speed update can be made to approach closely the minimum increase possibly, namely $$\eta = \frac{1}{p_T} = \epsilon^{\frac{R_s^{*2}}{2\Gamma P_N}}. \quad (17)$$

In view of (16), the minimum update-increase factor $\eta$ can also be written $$\eta = [(1 + \Gamma) p_N]^{-1/\Gamma} \quad (18)$$

For example, if $\Gamma = 5$, an $R_s^* = 0$ (no thresholding) yields a noise error, from (16), of 1/6, or 16.7%. If it is desired to reduce the error to 1/200 or 0.5%, (18) gives $\eta = (6/200)^{-1/5} = 2.02$; this is found, via (16) and (12), to correspond to $R_T = 2\quad 2P_N$. That is, by use of this threshold level, system noise error is reduced from 16.7% to 0.5% at the expense of doubling the speed update time. Without thresholding, the achievement of 0.5% noise error would require $\Gamma = 200$, an increase of 16 decibels.

As a second example, suppose $\Gamma = 100$ which yields a noise error of 1% without thresholding. To reduce this to 0.01% requires an update increase factor of only $\eta = (101/10,000)^{-1/100} = 1.047$, i.e., 4.7% with a suitable threshold as determined from (16) and (12).

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Improved-accuracy doppler sonar equipment of the type in which reflected acoustic energy is evaluated during desired measurement intervals, said improvement comprising signal processing channel means having input means for providing a voltage representative of the instantaneous value of the received acoustic energy, means for detecting the envelope of the signal-plus-noise fluctuations of voltages produced by said input means, thresholding means responsive to the output of said detecting means for producing an enabling signal when and only when said envelope exceeds a predetermined threshold, zero-crossing comparator means for producing output pulses when the instantaneous voltage from said input means traverses the zero axis, N-period counter means coupled to receive pulses from said zero-crossing comparator means, means to produce a doppler gate signal in response to the occurrence of an enabling signal during a measurement interval, means to permit the N-period counter to count pulses only during the occurrence of a doppler gate signal, and means to terminate said doppler gate signal when the N-period counter has responsed to N counts; said equipment further including means responsive to the time integral of the doppler gate signals for determining the net time required for the N-period counter to count N pulses during a given measurement interval, and means for displaying the net time so determined in desired units.

2. The device of claim 1 wherein the equipment is of the Janus type utilizing a pair of azimuthly opposed acoustic beams, and wherein said signal processing channel means includes first and second individual channels responsive to received acoustic energy from first and second beams in said pair respectively, said doppler gate responsive means being coupled to respond differentially to the doppler gate signals from said first and second individual channels, said doppler gate responsive means further being characterized in that such means provides an indication of the difference in net times required for the N-period counters in the individual channels to respond to N counts.

3. The device of claim 2 wherein the doppler gate responsive means includes a calibrated source of clock pulses and an up-down counter coupled to receive clock pulses through gating means enabled by doppler gate signals from both signal processing channels, and wherein said doppler gate terminating means in each signal processing channel further includes means for providing signals to said doppler gate responsive means when the respective N-period counters have responded to N counts, said gating means including a first gate arranged to apply clock pulses to said up-down counter in a first direction in response to the presence and absence of doppler gate signals in said first and second signal processing channels respectively, and to apply clock pulses to said up-down counter in the opposite direction in response to the presence and absence of doppler gate signals in said second and first signal processing channels respectively, said doppler gate responsive means further including shift register means for reading out and temporarily storing information from the up-down counter in response to the occurrence of signals from the doppler gate terminating means in both signal processing channels, and means for re-setting the up-down counter after the information has been stored in the shift register, said device being still further characterized in that the display means includes means for converting the information stored in said shift register into equivalent units of speed measurement.

4. The device of claim 3 in which the means for reading information out of said up-down counter further includes means for re-setting the N-period counters in both signal processing channels and means to produce a COUNT READY signal for preparing said doppler gate signal producing means for initiation of a new measuring interval.

5. The device of claim 4 in which the equipment is a pulsed doppler system having pulsed transmitter means for launching bursts of acoustic energy and means for producing a range gate signal at a predetermined time after the inception of each burst of transmitted energy, said improvement being further characterized in that each doppler gate signal producing means includes a doppler gate generator and turn-on logic means for preparing said doppler gate generator for the initiation of a doppler gate signal, said doppler gate generator being connected to receive pulses from the corresponding zero-crossing comparator means and output signals from the turn-on logic means, said turn-on logic means being constructed to provide an output signal in response to the simultaneous occurrence of a range gate signal, a COUNT READY signal, and an enabling signal from said thresholding means, said doppler gate generator being constructed to initiate a doppler gate signal upon the reception of the first pulse from the zero-crossing comparator occurring after the appearance of an output signal from said logic means.

6. The device of claim 5 further characterized in that each doppler gate signal producinng means includes turn-off logic means for producing an output signal that prepares the doppler gate generator for terminating a doppler gate signal upon the reception by said generator of a pulse from said zero-crossing comparator, said turn-off logic means being constructed to produce an output signal in response to either the absence of an enabling signal from said thresholding means or the appearance of a signal from said terminating means indicating that the corresponding N-period counter has counted N pulses.

7. The device of claim 6 wherein said envelope detecting means is an R-C circuit proportioned so that the voltage output from said detecting means follows the relatively slow fluctuations of the desired signal in the received energy but averages the relatively rapid noise fluctuation therein.

8. The device of claim 7 wherein said input means includes transducer means and a tuned limiting amplifier responsive thereto, said amplifier being tuned to pass frequencies within the range of doppler shifts expected for all ship speed conditions, said amplifier further having substantially constant gain for all signal levels up to a limiting value which is greater than said predetermined threshold value.

9. Sonar doppler equipment for a marine vessel including:
A. means for transmitting a beam of acoustic energy outwardly from the hull of said vessel,
B. receiving means responsive to reflected acoustic energy returning to the vessel along the path of said beam,
C. signal combining and display means,
D. a signal processing channel for coupling signals from said receiving means to said signal combining and display means, said processing channel including:
1. threshold comparator means for producing an enabling signal only during such times that the envelope of the received signals exceeds a predetermined threshold,
2. N-period counter means responsive to instances when the received signal traverses a zero reference level, said counter means including means for producing a first COUNT COMPLETE signal when the stored count reaches a preselected value,
3. condition responsive means for producing a first doppler gate for turning on said N-period counter when and only when said threshold comparator produces an enabling signal during a desired measurement interval, said condition responsive means being further arranged to terminate the doppler gate in response to a first COUNT COMPLETE signal from said N-period counter,
4. means for applying said first doppler gate and said first COUNT COMPLETE signal to said signal combining and display means,
E. means for generating a second doppler gate and a second COUNT COMPLETE signal during a desired measurement interval,
F. means for applying said second doppler gate and said second COUNT COMPLETE signal to said signal combining and display means,
G. said signal combining and display means including:
1. means for measuring a time interval during which one and only one of said doppler gates is applied to the signal combining and display means, and
2. means for displaying a measured time interval in response to the simultaneous occurrence of first and second COUNT COMPLETE signals.

10. The equipment of claim 9 wherein the transmitting means includes means for simultaneously launching beams of acoustic energy in azimuthly opposed directions downwardly and outwardly from the hull of the vessel, and wherein the receiving means includes individual means responsive to reflected energy returning from each of the azimuthly opposed directions, said equipment being further characterized in that the means for applying the second doppler gate and the second COUNT COMPLETE signal includes a second channel identical to said signal processing channel, said signal processing channel and said second channel being responsive to signals received from the first and second of said azimuthly opposed directions respectively.

11. The equipment of claim 10 wherein the means for measuring a time interval includes first and second AND gates connected to receive doppler gates from said signal processing channel and said second channel respectively and inverted doppler gate signals from said second channel and said signal processing channel, respectively, both of said AND gates being further coupled to receive signals from a clock source, said measuring means further including an up-down counter coupled to receive up-counting and down-counting pulses from said first and second AND gates, respectively, said measuring means still further including register means arranged for temporarily storing information read out of said up-down counter in response to COUNT COMPLETE signals appearing simultaneously in both of said signal processing and second channels, said display means being constructed and arranged for providing a visual indication of the information temporarily stored in said register.

* * * * *

UNITED STATES PATENT OFFICE
CERTIFICATE OF CORRECTION

PATENT NO. : 3,863,198
DATED : January 28, 1975
INVENTOR(S) : Seymour D. Lerner

It is certified that error appears in the above-identified patent and that said Letters Patent are hereby corrected as shown below:

Column 7, line 56, "output R" should read -- output $\overline{R}$ --.
Column 8, formula (18), that portion of the formula reading "$P_N] ^{-1/}$"

should read -- $P_N]^{-1/\Gamma}$ --;

line 48, "$2P_N$" should read -- $\sqrt{2P_N}$ --.

Signed and sealed this 13th day of May 1975.

(SEAL)
Attest:

RUTH C. MASON
Attesting Officer

C. MARSHALL DANN
Commissioner of Patents
and Trademarks